US012595837B2

(12) United States Patent
Möschen-Siekmann et al.

(10) Patent No.: US 12,595,837 B2
(45) Date of Patent: Apr. 7, 2026

(54) BELT OR BELT SEGMENT

(71) Applicant: ContiTech Transportbandsysteme GmbH, Hannover (DE)

(72) Inventors: Michael Möschen-Siekmann, Nörten-Hardenberg (DE); Waldemar Mick, Moringen (DE); Julian Terpe, Osterode am Harz (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 49 days.

(21) Appl. No.: 18/018,571

(22) PCT Filed: Jun. 17, 2021

(86) PCT No.: PCT/DE2021/200081
§ 371 (c)(1),
(2) Date: Jan. 29, 2023

(87) PCT Pub. No.: WO2022/022785
PCT Pub. Date: Feb. 3, 2022

(65) Prior Publication Data

US 2023/0296159 A1      Sep. 21, 2023

(30) Foreign Application Priority Data

Jul. 31, 2020    (DE) ..................... 10 2020 209 718.6

(51) Int. Cl.
*F16G 3/02*          (2006.01)
*B65G 15/34*        (2006.01)
(52) U.S. Cl.
CPC .............. *F16G 3/02* (2013.01); *B65G 15/34* (2013.01)

(58) Field of Classification Search
CPC ..... F16G 3/02; F16G 3/00; F16G 3/08; F16G 3/09; F16G 1/12; B65G 15/34; B65G 15/00; B65G 15/36
See application file for complete search history.

(56) References Cited

U.S. PATENT DOCUMENTS 8,770,394 B2 *   7/2014   Huels ..................... B65G 15/50
                                                                       198/844.2
2004/0195079 A1 *  10/2004  Webster ................... F16G 3/02
                                                                       198/848
(Continued)

FOREIGN PATENT DOCUMENTS

DE      102015212748 A1 *  1/2017  ............... F16G 3/00
DE      102015214395 A1 *  2/2017  ............... F16G 3/09
(Continued)

OTHER PUBLICATIONS

IPSearch History Nov. 22, 2025 UTC; InnovationQ+; https://iq.ip.com/discover (Year: 2025).*
(Continued)

*Primary Examiner* — Gene O Crawford
*Assistant Examiner* — Abby A Jorgensen
(74) *Attorney, Agent, or Firm* — Lippes Mathias LLP

(57) ABSTRACT

A belt or belt segment has a plurality of reinforcement members which run in the longitudinal direction (X) and are arranged parallel to one another and which are embedded at least substantially into an elastomer main body. The belt or belt segment has at least one connection element which is arranged on an open end The ends of the reinforcement members are each at least substantially exposed by and/or left free of the elastomer main body. The ends of the reinforcement members are each connected in a force-fitting manner to at least one clamping element. The clamping elements are held in a form-fitting manner in a connection section (A) by the connection element. The belt or the belt (Continued)

Figure 1:
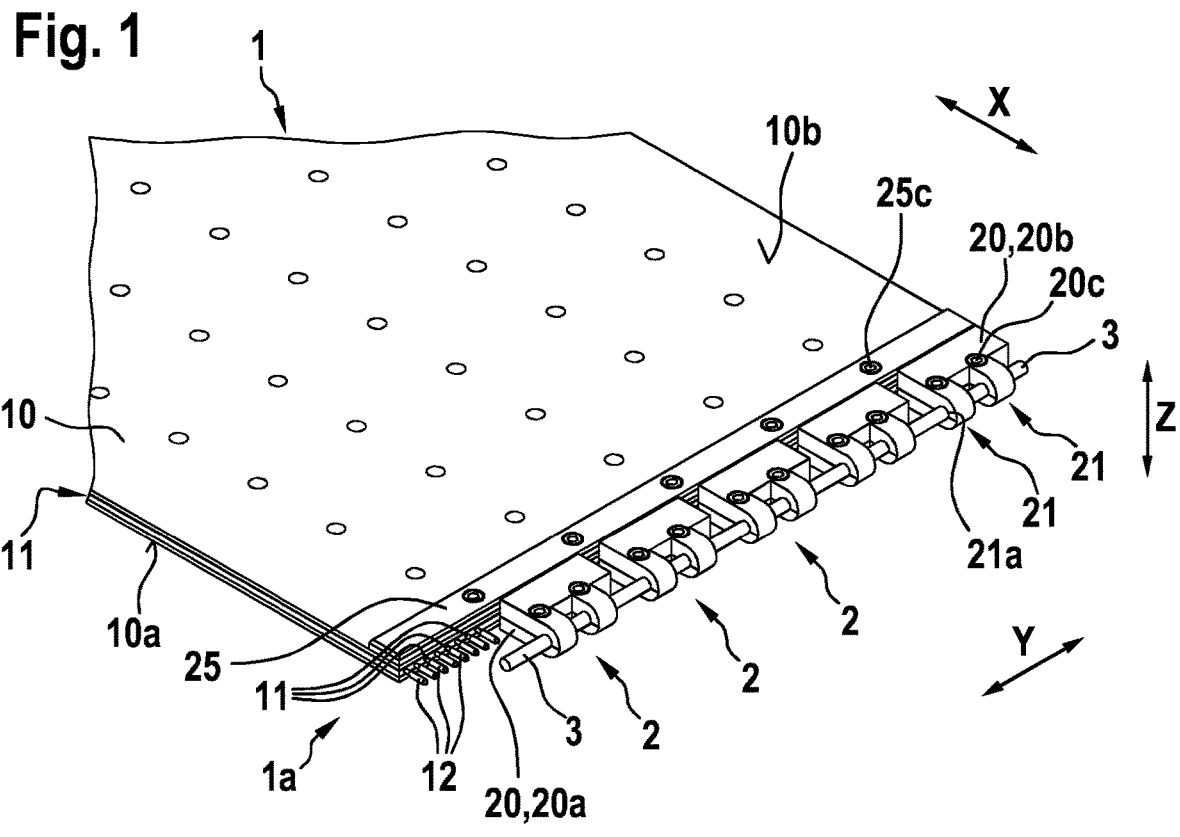

segment has at least one extension element which directly adjoins the connection section (A) in the longitudinal direction (X) and which at least sectionally forms an extension section (B) of the connection element in the longitudinal direction (X). The reinforcement members are received in the extension section (B) by the extension element and are guided at least sectionally in a rectilinear manner in the longitudinal direction (X).

14 Claims, 1 Drawing Sheet

(56)                    References Cited

U.S. PATENT DOCUMENTS

| | | | | |
|---|---|---|---|---|
| 2013/0213774 A1* | 8/2013 | Huels | | F16G 3/00 |
| | | | | 198/844.2 |
| 2015/0075951 A1* | 3/2015 | Moeschen-Siekmann | | |
| | | | | F16G 3/02 |
| | | | | 198/844.2 |
| 2018/0128348 A1* | 5/2018 | Huels | | F16G 3/00 |
| 2018/0149233 A1* | 5/2018 | Huels | | B65G 15/36 |
| 2018/0298985 A1* | 10/2018 | Huels | | F16G 11/10 |
| 2020/0116231 A1* | 4/2020 | Dailey | | F16G 3/04 |

FOREIGN PATENT DOCUMENTS

| | | | | | |
|---|---|---|---|---|---|
| EP | 3115640 A1 | * | 1/2017 | .............. | F16G 3/09 |
| EP | 3115641 A1 | | 1/2017 | | |
| EP | 3115642 A1 | | 1/2017 | | |
| FR | 74662 E | * | 12/1960 | | |
| FR | 2116609 A5 | * | 7/1972 | | |
| WO | WO-2005049454 A2 | * | 6/2005 | .............. | F16G 3/00 |
| WO | 2012038155 A1 | | 3/2012 | | |
| WO | 2013174666 A1 | | 11/2013 | | |
| WO | 2016087072 A1 | | 6/2016 | | |
| WO | 2017005384 A1 | | 1/2017 | | |
| WO | 2017016687 A1 | | 2/2017 | | |
| WO | 2017102116 A1 | | 6/2017 | | |

OTHER PUBLICATIONS

Chinese Office Action dated Sep. 12, 2023 corresponding to Chinese Patent Application No. 202190000703.8.
International Search Report and Written Opinion dated October 5, 2021of International Application PCT/ DE2021/200081 on which this application is based.

* cited by examiner

BELT OR BELT SEGMENT

The present invention relates to a belt or a belt segment as per the preamble of patent claim 1.

Endlessly closed belts have long been known in various technical fields. Such belts may be used as drive belts, conveyor belts and the like. For this purpose, such belts may be produced so as to be already endlessly closed, this however not being possible for every application. Then, the belts are produced so as to be open and, for example, are endlessly closed at the place of application in that the two open ends are connected to one another. It is also possible for correspondingly long belts to be made up of belt segments which, for example, at the place of application, are connected to one another and finally endlessly closed. Such applications of conveyor belts may be in particular the conveyor-belt systems for transporting loose bulk materials and the like for example in the mining sector.

Such belts normally have an elastically deformable main body which may consist substantially for example of an elastomer material, such as for example a vulcanized rubber. In the longitudinal direction, as running direction, of the belt, in which the belt is endlessly closed in the application, there is normally at least one tensile member embedded into the material of the main body. As such a tensile member, use may be made for example of an areal textile material, such as for example a fabric in the case of so-called textile belts. Alternatively, steel-cable conveyor belts, in the case of which a plurality of steel cables running parallel to one another is embedded into the main body as tensile members, are known. Such tensile members serve for transmitting tensile forces in the longitudinal direction of the belt, which corresponds to the running direction of the belt. The tensile member may, in any case, be endlessly closed, too.

In order to endlessly close such belts, it has been known for some time to expose the tensile member(s) at both ends of the belt by removal of material of the elastomer main body, to connect the exposed open ends of the tensile member(s) to one another, for example by way of splicing in the case of steel cables, and to fill the exposed section of the steel cables with the material of the main body again. If, in this case, rubber is used as the material of the main body of the belt, then vulcanization is to be applied at said section again.

Since this type of connection of the open ends of the belt and of corresponding belt segments can constitute a considerable outlay in particular if, in the case of a steel-cable conveyor belt, the steel cables are to be exposed, to be spliced and subsequently to be subjected to vulcanization, it is known from WO 2012 038 155 A1 to plug the exposed steel cables into corresponding longitudinal bores of a hinge plate, and there to fix said steel cables in a positionally secure manner by way of press-fitting of the hinge plate, at each of the two open ends of the belt. At their free ends, the two hinge plates each form a part-hinge with crenelated projections, which can be connected in a rotatable manner to the in each case other part-hinge by means of a coupling rod.

It is possible in this way to factory-produce such belts or corresponding belt segments with a hinge plate at the open ends and to mechanically connect them in a simple and quick manner at the place of the corresponding application. In particular, on-site vulcanization can be dispensed with.

A disadvantage in this case, however, is that the part-hinges can be distorted when press-fitting is realized. This can result in increased wear of the hinge-like coupling of the coupling rod, since the crenelated projections can rub against one another. In this way, the crenelated projections, and also passage openings thereof for the coupling rod, can become weakened to such an extent that the hinge-like connection can tear.

A further disadvantage is that the two rotatably connected, hinge-like connection elements, and in particular the crenelated projections thereof, and the coupling rod or the vertically upwardly and/or vertically downwardly facing outer regions thereof are subjected to the significant wear during use as intended. In WO 2012 038 155 A1, however, exchanging the hinge-like connection elements constitutes, owing to the direct press-fitting of the steel-cable ends in the hinge-like connection element, a considerable outlay, since the entire connection element is to be removed and exchanged.

On the basis of this, WO 2016 087 072 A1 describes such a hinge-like connection of two open ends of a belt with elongate reinforcement members in the form of steel cables, wherein each reinforcement-member end has an individual holding element which is fastened in a force-fitting manner and which, as a metallic sleeve, is held by way of press-fitting on the respective open steel-cable end. All the individual holding elements, fastened in a force-fitting manner, of an open end of the belt are in this case jointly held in a form-fitting manner in the longitudinal direction in a hinge-like connection element, in each case in an individual receiving space or in a common receiving space, by holding elements in the form of upwardly protruding projections. The hinge-like connection element forms, situated oppositely in the longitudinal direction, at the same time in one piece, the crenelated projections of the hinge-like connection.

In this way, each open steel-cable end can be individually press-fitted to a metallic sleeve independently of the hinge-like connection element, so that it is possible for the press-fitting to no longer affect the hinge-like connection element. Subsequently, all the sleeves can be placed into a receiving space of the connection element and, there, be held in a form-fitting manner in the longitudinal direction by the holding elements. This can simplify the press-fitting since in each case exactly one steel-cable end is press-fitted to exactly one metallic sleeve. The press-fitted connection between sleeve and steel-cable end can thus be achieved with smaller forces per steel-cable end but with an effect which is comparable to that in WO 2012 038 155 A1, which can reduce the outlay and can allow the use of a press-fitting tool with smaller forces. It is also possible for the same holding forces between sleeve and steel-cable end as in WO 2012 038 155 A1 to be made possible with a shorter length of the press-fitted connection, which can reduce the structural length of the hinge-like connection in comparison with WO 2012 038 155 A1 and can allow the use of such hinge-like connections even in the case of relatively small diversion radii. Alternatively, the holding forces per press-fitted connection between sleeve and steel-cable end can be increased, which can increase the durability or the load-bearing capacity of the press-fitted connection and thus the transmissible tensile forces per press-fitted connection of sleeve and steel-cable end.

A disadvantage with the press-fitted connection between individual sleeves and individual steel-cable ends, however, is that, among the different press-fitted connections of a hinge-like connection element, significant variations in the holding forces of the press-fitted connection can occur, which can result specifically from the individual press-fitting per sleeve and steel-cable end. This can result in particular from different deformations of the sleeves on the steel-cable ends.

A further disadvantage is that, among the individual press-fitted sleeves on the steel-cable ends, in terms of their positions, variations can occur such that some sleeves within the receiving space do not make contact with the holding elements at all, or can be held by the holding elements with relatively small forces. This result in an increase in the proportion of the tensile forces of those sleeves which, owing to their positioning along the respective steel cable, are arranged closer to the holding elements. This increased loading of these sleeves can subject the corresponding press-fitted connection to excessive stress and, in this way, cause the latter to tear. This can also result in a non-uniform force distribution in the transverse direction of the connection element, such that the coupling of the two hinge-like connection elements can be subjected to non-uniform loading and can likewise fail. The non-uniform force distribution in the transverse direction of the connection element can also result in skewed running of the belt.

Known from EP 3 115 640 A1 and from WO 2017 016 687 A1 is in each case a comparable belt or a comparable belt segment, in the case of which however at least two reinforcement-member ends are press-fitted, and held in a force-fitting manner, in a common clamping body. The clamping body is then placed in a clamping-body receiving part of the hinge-like connection element and, there, held in a form-fitting manner by holding elements in the form of upwardly protruding projections. It is also possible for there to be provided multiple such clamping-body receiving parts, which are separated in the transverse direction by webs running in the longitudinal direction and can each receive a clamping body with a reinforcement-member end which is held in a force-fitting manner.

A disadvantage with the reinforcement-member ends press-fitted in a common clamping body is that, by way of the press-fitting of the reinforcement-member ends, in particular in the transverse direction, displacement of the reinforcement members can occur, which may also be referred to as pitch error. In this way, the tensile forces can be transmitted obliquely rather than rectilinearly in the longitudinal direction, which can result in non-uniform force transmissions and loads of the individual reinforcement members or the press-fitted connections thereof in relation to the common clamping body. This can lead to tearing or breaking of the reinforcement members or the press-fitted connections thereof.

It is known for example from WO 2013 174 666 A1, from WO 2016 087 072 A1, from EP 3 115 640 A1, from EP 3 115 641 A1, from EP 3 115 642 A1, from WO 2017 005 384 A1, from WO 2017 016 687 A1 and from WO 2017 102 116 A1 in each case that the clamping openings of the hinge-like connection elements have a widening or a widened opening, in particular of a hyperbolic shape, such that, during running onto and on the drum, it is always the case that a maximum permissible bending radius of the reinforcement members is supported in that the reinforcement members are constantly in the neutral phase of the belt. In this way, diversion or deflection of the reinforcement members can be avoided or at least reduced, which can protect the reinforcement members and can increase the service lives thereof.

What is common to the above-described hinge-like connection elements and the like is that the reinforcement members, and in particular the steel cables, are consistently received in a form-fitting manner at the ends thereof exposed by removal of elastomer material of the belt by the hinge-like connection elements by means of individual or common force-fitting clamping elements. In this way, during operation, there act on the hinge-like connection elements, clamping elements and reinforcement-member ends not only the tensile load of the tensile members continuously in the direction of movement but, during diversion, that is to say when a drum of the corresponding conveyor-belt system is run around, also the corresponding bending loads. In particular said bending loads can subject the hinge-like connection elements, the clamping elements and/or the reinforcement-member ends to intense loading and reduce the service lives thereof.

An object of the present invention is to provide a belt or a belt segment of the type described in the introduction such that the bending loads, in particular during diversion, can be reduced. Additionally or alternatively, it is intended that the ingress of contaminants, liquids and the like into the connection region of such belts or belt segments be reduced or prevented. It is at least intended that an alternative to such belts or belt segments that are known be provided.

The object is achieved according to the invention by a belt or by a belt segment that has the features as per patent claim 1. Advantageous refinements are described in the dependent claims.

Consequently, the present invention relates to a belt or a belt segment that has a plurality of reinforcement members, preferably steel cables, which run in the longitudinal direction and are arranged parallel to one another and which are embedded at least substantially into an elastomer main body, and has at least one connection element which is arranged on an open end of the belt or of the belt segment and which is configured for connection to a further connection element of the other open end of the belt or of an open end of a further belt segment, wherein the ends of the reinforcement members are each at least substantially exposed by and/or left free of the elastomer main body, wherein the ends of the reinforcement members are each connected in a force-fitting manner to at least one clamping element, preferably to at least one sleeve, and wherein the clamping elements are held in a form-fitting manner in a connection section by the connection element at least in the longitudinal direction. Such belts or belt segments are known from the prior art described in the introduction.

The belt according to the invention or the belt segment according to the invention is characterized in that the connection element has at least one extension element which directly adjoins the connection section in the longitudinal direction and which at least sectionally, preferably completely, forms an extension section of the connection element in the longitudinal direction, and in that the reinforcement members of the open end of the belt or of the belt segment are received in the extension section by the extension element in such a way that the reinforcement members are guided at least sectionally, preferably completely, in a rectilinear manner in the longitudinal direction.

In other words, the connection element can be subdivided into at least two sections in the longitudinal direction. Within the connection section, the form-fitting holding of the clamping elements can be realized as from the prior art described in the introduction. In this case, according to the invention, the connection section of the connection element is adjoined directly, that is to say without a spacing, in the longitudinal direction by the extension section, which extends the connection element in the longitudinal direction beyond the connection section. In this case, the reinforcement members, which are held in a form-fitting manner in the connection section of the connection element by means of their clamping elements, are guided in a rectilinear manner in the longitudinal direction in the extension section of the connection element away or onward from the connection section of the connection element. In this way, bending of the reinforcement members within the extension section of the connection element can be avoided. In particular, it is possible in this way for bending of the reinforcement members at the transition from the connection section into the extension section to be avoided.

The clamping elements may be individually formed and connected in a force-fitting manner, for example by way of press-fitting, to a respective open end of a reinforcement member. Alternatively, the clamping elements of the individual reinforcement members may also be connected to one another, or the clamping elements may be configured to receive, and to hold, multiple reinforcement members parallel to one another in an inherently force-fitting manner.

In this case, the present invention is based on the realization that, in the case of the belts and belt segments of the prior art described in the introduction, such as for example WO 2016 087 072 A1 and EP 3 115 640 A1, or in the case of the connection elements thereof, the reinforcement members, within the connection element or the connection section thereof, are bent at least inward, that is to say toward a diverting drum or the like, and in this way is subjected both to tensile force and to bending load directly at the clamping elements. This can result in relatively high loads, which can reduce the service lives of the reinforcement members themselves and/or of the clamping elements on the reinforcement members.

According to the invention, the reinforcement members are therefore guided in a rectilinear manner in the longitudinal direction away from the form-fitting holding point of their clamping elements in the connection section of the connection element by means of the connection section of the connection element, so that the bending can take place for the first time within the extension section or at the end of the extension section facing away from the clamping elements. In this way, the positions at which the reinforcement members are subjected to tension and to bending load are spaced apart from one another in the longitudinal direction. In this way, the forces or loads acting on the reinforcement members can be distributed in the longitudinal direction and the locally acting forces or loads can thereby be reduced. This can increase the longevity and/or the load-bearing capacity of the reinforcement members.

The connection element can preferably of hinge-like design, as known for example from EP 3 115 640 A1. This can make possible a hinged connection of the two connection elements to one another, which can be established in particular by means of a coupling element, for example in the form of a coupling rod, and, as necessary, released again for repair purposes too.

According to one aspect of the invention, the reinforcement members of the open end of the belt or of the belt segment are at least substantially, preferably completely, embedded into the elastomer main body in the extension section. In this way, the belt or the belt segment itself may, with regard to its formation, differ in the connection section and in the extension section of the connection element. Whereas, within the connection section, the elastomer main body of the belt or of the belt segment is at least substantially not present and preferably not present at all in the vertical direction, the extension section at least sectionally, preferably substantially, and particularly preferably completely, has, at least in the longitudinal direction, the elastomer main body, which surrounds the reinforcement members, that is to say into which the reinforcement members are embedded.

In this way, the reinforcement members can be protected or remain in the extension section over the above-described extent in the longitudinal direction. In this way, too, it is possible for guidance, holding or clamping of the reinforcement members on the part of the connection element in the extension section, preferably by means of at least one extension element, as will be described in more detail below, to be achieved or improved, since the contact surfaces of the belt or of the belt segment itself in relation to the reinforcement members can be enlarged.

According to a further aspect of the invention, the thickness of the elastomer main body in the extension section corresponds at least sectionally to the thickness of the elastomer main body adjacent to the extension element in the longitudinal direction. In other words, the belt or the belt segment in itself may be used for being arranged in the extension section of the connection element, or for being received by the extension section of the connection element, by way of its intended or typical thickness. This can save or avoid outlay since the thickness of the elastomer main body does not need to be reduced at this position and the reinforcement members do not need to be exposed by the elastomer main body at this position. This can also promote the stability of guidance, holding or clamping of the elastomer main body on the part of the connection element in the extension section.

According to a further aspect of the invention, the reinforcement members of the open end of the belt or of the belt segment are received in the extension section by the extension element in such a way that preferably at least significant bending of the reinforcement members in relation to the longitudinal direction can occur for the first time at that end of the extension section, preferably of the extension element, which faces away from the connection section in the longitudinal direction. This may be realized in particular as described above and/or result in the above-described properties and advantages.

According to a further aspect of the invention, the extension element has at least one first extension-element part and one second extension-element part, which, at least substantially in the vertical direction, are arranged on both sides of the reinforcement members of the open end of the belt or of the belt segment in the extension section, wherein the two extension-element parts receive the reinforcement members of the open end of the belt or of the belt segment between them in a contacting, preferably clamping, manner in the extension section at least substantially in the vertical direction. The holding of the two extension-element parts can be achieved for example by means of fastening means, such as for example screws.

In this way, it is possible to realize a corresponding mechanical support to avoid bending of the reinforcement members within the extension region of the connection element, which can result in the above-described properties and advantages. Due to the direct connection of the extension element of the connection element to the connection region thereof, it is at the same time possible for bending in the region of the transition of the reinforcement members from the connection section into the extension section to be avoided, which can likewise result in the above-described properties and advantages.

According to a further aspect of the invention, the connection element has in the connection section at least one connection-element body by which the clamping elements are held in a form-fitting manner at least in the longitudinal direction, wherein the extension element and the connection-element body are formed at least sectionally in one piece or in two pieces.

In other words, on the one hand, the extension element and the connection-element body may be formed, for example by a casting process, in one piece, that is to say so as to consist of one piece, so that a body of the extension element or the two bodies of two extension-element parts and the connection-element body transition into one another in terms of material. In particular, it is possible for a body of the extension element or for the two bodies of two extension-element parts to be formed on the connection-element body as projections substantially in the longitudinal direction. This can simplify production and/or assembly through the reduction of the components to be handled. This can also ensure that the extension region is arranged directly adjacent to the connection region in the longitudinal direction.

On the other hand, the extension element and the connection-element body may also be formed as separate components, which, for example, have been formed separately by a casting process and have been arranged directly against one another at the open end of the belt or of the belt segment in order to, at least functionally, jointly form the connection element as described above. These separate components of the connection element then form multiple individual pieces or multiple individual parts. This can increase the freedom of design since different extension elements and connection-element bodies can be combined with one another. This can also simplify an exchange, for example for repair purposes. Furthermore, it is possible in this way for the extension element to be added to or retrofitted into existing known connection elements in order to develop said connection elements into connection elements according to the invention.

According to a further aspect of the invention, the extension element is of continuous form in the transverse direction and/or in the longitudinal direction. This can simplify the production or the assembly of the connection element according to the invention.

According to a further aspect of the invention, the connection element has a plurality of holding elements and reinforcement-member leadthroughs, which are arranged at least sectionally in an alternating manner in the transverse direction, wherein the holding elements are configured to hold at least one clamping element in a form-fitting manner. This can make it possible to realize a form-fitting hold.

According to a further aspect of the invention, the holding elements are in the form of projections of the connection element that protrude upward in the vertical direction. This can make it possible to realize holding elements which can achieve a form-fitting hold of the clamping elements.

According to a further aspect of the invention, the connection element has in the connection section at least one connection-element body with at least one clamping-element receiving part in which at least one clamping element is received, wherein the clamping-element receiving part is formed at least substantially, preferably completely, by at least one first connection part and one second connection part, which, in the vertical direction, are arranged toward one another and are connected to one another. In this way, it is possible for there to be created within the connection-element body a space or a volume in which the clamping elements of the reinforcement members can be received, and held in a form-fitting manner in the longitudinal direction, in the connection section. At the same time, the clamping-element receiving part can be closed to a sufficient extent by the two connection parts in order to be able to protect the clamping elements of the reinforcement members from contaminants, liquids and the like. This can avoid for example corrosion and, in this way, increase the durability or the longevity and/or the load-bearing capacity of the reinforcement members or of the force-fitting clamping elements thereof.

In other words, prior-art locks or connection elements have both tensile force and bending load to bear while running around the drum. Furthermore, due to the diversion of the reinforcement members, such as for example the cables, said locks are generally designed so as to be open toward the belt, which can result in the ingress of contaminants or the like.

According to the invention, the reinforcement members or the cables, within the lock or the connection-element body, can be used exclusively for transmitting the tensile force. A second structural element or else a structural element integrated in the lock, such as for example an extension element, can fix the reinforcement members or the cables in the tension-direction position thereof and thus displace the rotational movements or the deflections of the reinforcement members or the cables into the non-exposed belt region. This is to be realized in one piece or multiple parts.

In this way, the load-bearing capacity of the connection between the two connection elements can be increased. This can also improve the dynamic load-bearing capacity or the dynamic performance of the connection between the two connection elements. It is also possible in this way for tightness of the connection element with respect to contaminants, liquids and the like to be achieved.

Figure 2:
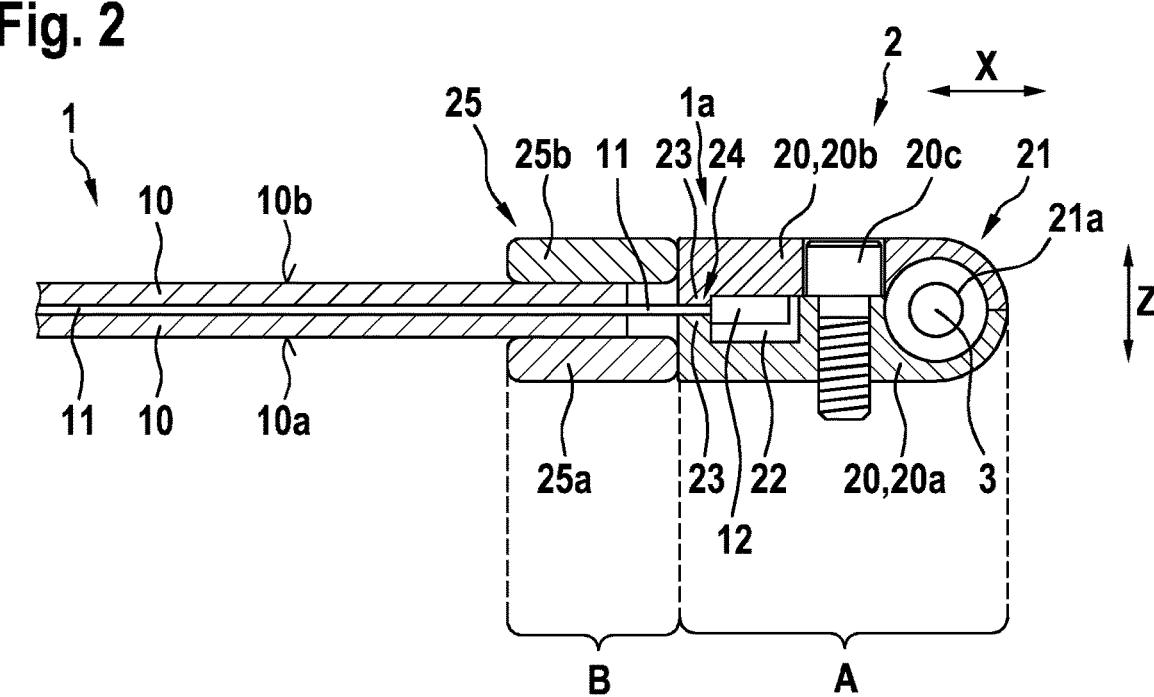

An exemplary embodiment and further advantages of the invention will be discussed below in conjunction with the following figures. In the figures:

FIG. 1 shows a perspective schematic illustration of a connection element according to the invention; and FIG. 2 shows a longitudinal section through the illustration in FIG. 1.

The description of the aforementioned figures is given in Cartesian coordinates with a longitudinal direction X, a transverse direction Y, which is oriented perpendicularly to the longitudinal direction X, and a vertical direction Z, which is oriented perpendicularly both to the longitudinal direction X and to the transverse direction Y. The longitudinal direction X may also be referred to as the depth X, the transverse direction Y may also be referred to as the width Y, and the vertical direction Z may also be referred to as the height Z.

A belt 1 according to the invention is considered. The belt 1 according to the invention corresponds to a belt segment 1, too. An open end 1a of the belt 1 is considered.

The belt 1 consists substantially of an elastomer main body 10, which has vulcanized rubber as elastomer material. In the vertical direction Z, the elastomer main body 10 has a bottom side 10a and an oppositely situated top side 10b. Running parallel to one another in the longitudinal direction X are multiple reinforcement members 11 embedded into the elastomer main body 10, which reinforcement members may also be referred to as tensile members 11 and are formed by steel cables 11. The individual ends of the steel cables 11 are in this case exposed by removal of material of the elastomer main body 10 and in each case individually connected in a force-fitting manner by way of press-fitting to a clamping element 12 in the form of a metallic sleeve 12.

In order to be able to connect the open end 1a of the belt 1 for example to the further open end 1a of the same belt 1, use is made of multiple identically designed connection elements 2 which each have, for one thing, a connection-element body 20. The connection-element body 20 has a first, lower connection part 20a and a second, upper connection part 20b, which, in the vertical direction Z, are arranged one on top of the other or together and are releasably connected to one another by fastening means 20c in the form of screws 20c.

The two connection parts 20a, 20b form between them a clamping-element receiving part 22 as a cavity, in which the ends, provided with the sleeves 12, of the steel cables 11 are arranged multiply together parallel to one another and extending in the longitudinal direction X. Facing toward the belt 1 in the longitudinal direction X, the corresponding sides of the two connection parts 20a, 20b form, in an alternating manner in the transverse direction Y, holding elements 23 in the form of projections 23 protruding upward in the vertical direction Z and reinforcement-member lead-throughs 24. The steel cables 11 project in the longitudinal direction X through the corresponding reinforcement-member leadthroughs 24 to outside the connection-element body 20.

The connection-element body 20 forms, situated oppositely in the longitudinal direction X and facing away from the elastomer main body 10, crenelated projections 21 with passage openings 21a. In this way, an articulated or hinge-like connection to a similar connection element 2 of the oppositely situated open end 1a of the belt 1 can be created in that a coupling element 3 in the form of a rod 3 is guided in an alternating manner in the transverse direction Y through the passage openings 21a of the two connection-element bodies 20.

An extension element 25 directly adjoins the connection-element body 20 in the longitudinal direction X toward the elastomer main body 10. The extension element 25 has a first, lower extension-element part 25a and a second, upper extension-element part 25b, which, in the vertical direction Z, are arranged one on top of the other or together and are releasably connected to one another by fastening means 25c in the form of screws 20c. The two extension-element parts 25a, 25b are in this case arranged directly on the bottom side 10a and on the top side 10b, respectively, of the elastomer main body 10 and are pulled toward one another by their screws 25c in such a way that that region of the elastomer main body 10 which directly adjoins the exposed steel cables 11 is clamped between the two extension-element parts 25a, 25b.

At the same time, the two extension-element parts 25a, 25b are arranged directly on the two connection parts 20a, 20b of the connection-element body 20 in the longitudinal direction X, so that the two extension-element parts 25a, 25b, in the longitudinal direction X, bear directly against the two connection parts 20a, 20b of the connection-element body 20 and the two connection parts 20a, 20b of the connection-element body 20 thereby extend the connection parts 20a, 20b of the connection-element body 20 above and below said region of the elastomer main body 10 in the vertical direction Z. In this way, the steel cables 11 can be guided in a completely rectilinear manner in the longitudinal direction X away from the connection-element body 20; only when the elastomer main body 10 with the embedded steel cables 11 exits the extension element 25 can the steel cables 11 be bent, if the belt 1 runs over a diverting roller or the like of a belt system.

That section of the connection elements 2 which makes it possible for the sleeves 12 to be held in a form-fitting manner in the clamping-element receiving part 22 and for the connection to the further connection element 2 to be realized may accordingly be referred to as connection section A of the respective connection element 2. That section of the connection elements 2 which engages around, and holds, the elastomer main body 10 of the extension element 25 on both sides may be referred to as extension region B.

By means of the above-described formation of the extension region B, it is possible for bending of the steel cables 11 in the region of the sleeves 12 to be avoided, so that only tensile forces can act on the steel cables 11 in the region of the sleeves 12. Bending is possible only after the steel cables 11 have exited the extension element 25 or the extension region B, whereby these two types of load can be spaced apart from one another, or separated from one another, in the longitudinal direction X. This can distribute the loads more effectively and, in this way, reduce the maximum loads for the steel cables 11 occurring at a point or avoid a double load due to tensile forces and bending at the same point or close to one another in the region of the sleeves 12. This can increase the longevity of the steel cables 11.

Furthermore, the clamping-element receiving part 22 of the connection-element body 20 can be closed off by the two connection parts 20a, 20b in such a way that contaminants, liquids and the like cannot reach the open ends, received in said receiving part, of the steel cables 11 with the sleeves 12. This, too, can increase, for example through avoidance or through reduction of corrosion, the longevity of the steel cables 11.

LIST OF REFERENCE SIGNS (PART OF THE DESCRIPTION)

A Connection section
B Extension section
X Longitudinal direction; depth
Y Transverse direction; width
Z Vertical direction; height
1 Belt; belt segment
1a Open end of the belt 1 or of the belt segment 1
10 Elastomer main body
10a Bottom side of the elastomer main body 10
10b Top side of the elastomer main body 10
11 Reinforcement members; tensile members; steel cables
12 Clamping elements; sleeves
2 Connection elements
20 Connection-element body
20a First, lower connection part of the connection-element body 20
20b Second, upper connection part of the connection-element body 20
20c Fastening means or screws of the connection-element body 20
21 Crenelated projections of the connection element 2
21a Passage openings of the holding elements 21
22 Clamping-element receiving part
23 Holding elements or projections of the connection parts 20a, 20b
24 Reinforcement-member leadthroughs of the connection parts 20a, 20b
25 Extension element
25a First, lower extension-element part of the extension element 25
25b Second, upper extension-element part of the extension element 25
25c Fastening means or screws of the extension element 25
3 Coupling element; coupling rod

The invention claimed is:

1. A belt segment for a belt comprising:

a plurality of reinforcement members, which run in the longitudinal direction (X) and are arranged parallel to one another and embedded into an elastomer main body;

the plurality of reinforcement members comprising sleeves at ends;

an extension element positioned across a width of the belt segment, arranged on an extension region of an open end of the belt segment and having a lower extension-element and an upper extension-element arranged that releasably connected the plurality of reinforcement members;

the extension element forms an extension region (B) that prevents bending of the reinforcement members within the extension element;

a plurality of connection elements positioned across the width of the belt segment, arranged on a connection section of the open end;

the plurality of connection elements each comprising a connection element including upper and lower connection parts;

the upper and lower connection parts are connected by fasteners;

the connection elements directly adjoin the connection section in the longitudinal direction (X) to form extension sections;

an inner edge of each connection element is adjacent an outer edge of the extension element to mitigate movement in a Z direction, wherein the extension element and the connection element body are formed as separate components;

the sleeves and the ends of the plurality of reinforcement members are each connected in a force-locking manner within cavities to at least one clamping element of a plurality of clamping elements;

the plurality of clamping elements are jointly held in a form-locking manner in a connecting section by the connecting elements at least on the longitudinal direction (X).

2. The belt segment of claim 1, the reinforcement members are exposed in the connection section and embedded in the elastomer in the connection section.

3. The belt segment of claim 2, the elastomer in the connection sections has the same thickness of the elastomer of the belt segment.

4. The belt segment of claim 1, the connection element further comprising projections that protrude in the vertical direction (Z), holding elements are in the form of projections of the connection element that protrude upward in the vertical direction (Z).

5. The belt segment of claim 1, the plurality of connection elements comprise six individual connection elements.

6. The belt segment of claim 1, the connection section having a larger width (A) than the extension region (B).

7. The belt segment of claim 1, wherein each connection element comprises two projections having openings to receive the coupling rod.

8. The belt segment of claim 1, the connection element prevents bending of the reinforcement members and the extension element is configured to permit bending of the reinforcement members.

9. The belt segment of claim 1, the plurality of connection elements enclose ends of the reinforcement members to reduce corrosion.

10. The belt segment of claim 1, further comprising a gap in an elastomeric body within the extension region (B) and adjacent to the plurality of connection elements.

11. The belt segment of claim 1, wherein the ends of the reinforcement members are each non-positively connected to at least one clamping element and the clamping elements are positively held in a connecting section by the connecting element.

12. The belt segment of claim 1, wherein the plurality of connection elements have a connection-element body formed in two pieces.

13. A belt segment comprising:

a plurality of reinforcement members as steel cables, which run in the longitudinal direction (X) and are arranged parallel to one another and which are embedded at least substantially into an elastomer main body;

a plurality of clamping elements arranged on an open end of the belt segment and which is configured for connection to a further connection element of the other open end of the belt;

wherein the ends of the reinforcement members are each at least substantially exposed by and/or left free of the elastomer main body;

wherein the ends of the reinforcement members are each connected in a force-fitting manner to the plurality of clamping elements as at least one sleeve;

wherein the clamping elements are held in a form-fitting manner in a connection section (A) by the connection element in the longitudinal direction (X);

wherein the plurality of clamping elements have one extension element which directly adjoins the connection section in the longitudinal direction (X) and which completely, forms an extension section (B) of the connection element in the longitudinal direction (X); and wherein the reinforcement members of the open end of the belt or of the belt segment are received in the extension section (B) by the extension element in such a way that the reinforcement members are guided completely, in a rectilinear manner in the longitudinal direction (X), wherein the extension element comprises a lower extension element part and an upper extension element part arranged as releasably connecting the plurality of reinforcement members, and wherein the two extension element parts are arranged on the bottom side and the top side, respectively, of the elastomer main body.

14. The belt segment of claim 13, wherein the extension element extends across an entire width of the belt.

* * * * *